Feb. 10, 1925.  
T. TORKELSON  
DRAFT ATTACHMENT FOR VEHICLES  
Filed Nov. 1, 1922
1,526,189
REISSUED AS NO. 16756 OCT 4 1927
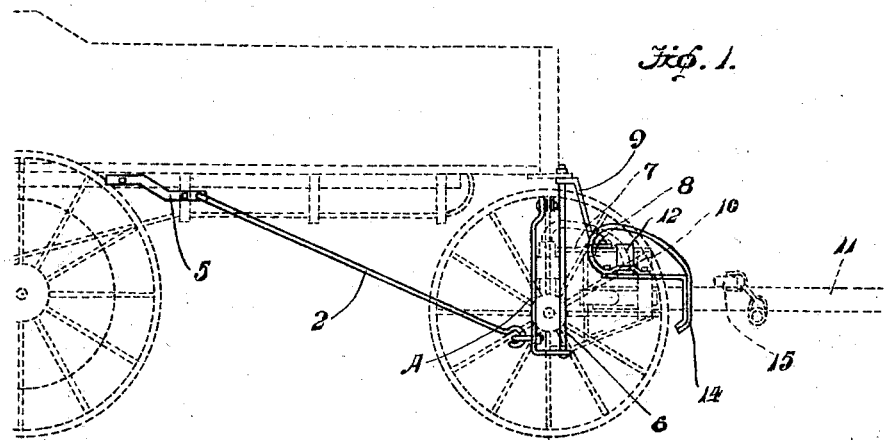
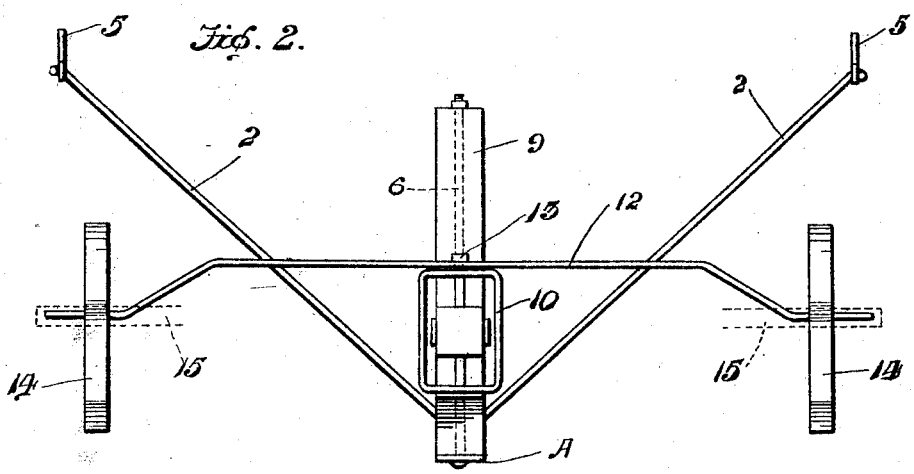
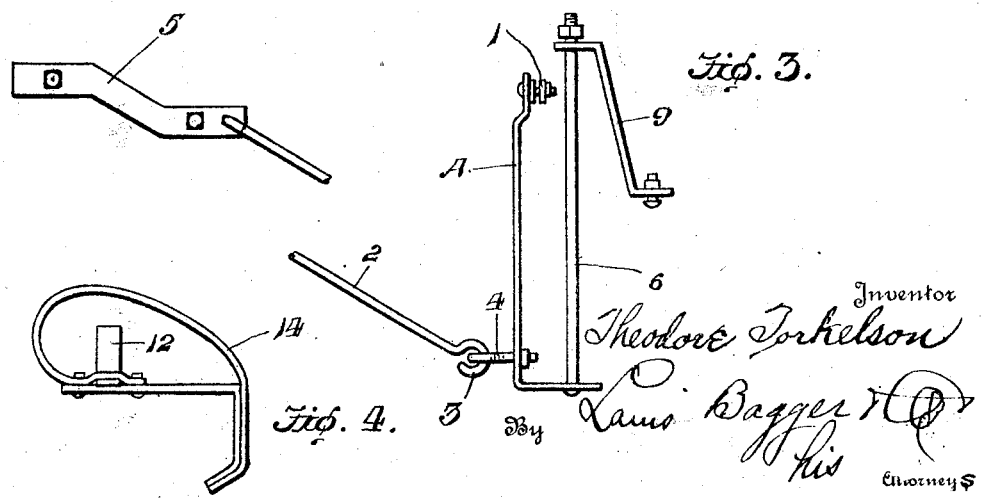
Inventor  
Theodore Torkelson  
By Lauris Bagger  
his Attorneys Patented Feb. 10, 1925.

1,526,189

UNITED STATES PATENT OFFICE.

THEODORE TORKELSON, OF MABEL, MINNESOTA.

DRAFT ATTACHMENT FOR VEHICLES.

Application filed November 1, 1922. Serial No. 598,354.

*To all whom it may concern:*

Be it known that I, THEODORE TORKELSON, a citizen of the United States, residing at Mabel, in the county of Fillmore and State of Minnesota, have invented certain new and useful Improvements in Draft Attachments for Vehicles, of which the following is a specification.

My invention relates to an improvement in draft attachments for vehicles.

The object is to provide a draft attachment capable of being used with any kind of vehicle to which draft animals are hitched.

The present invention is attachable to the front axle and tongue of the vehicle.

In the accompanying drawings:

Figure 1 is a view in side elevation; the vehicle being indicated by dotted lines.

Fig. 2 is a front view of the attachment; and

Figs. 3 and 4 are detached details.

A represents a bracket preferably made from a bar of sheet metal, the same being held by a clamp, or other means, 1 to a plate or other portion at the front of the vehicle at its upper end and to take the pulling strain, brace rods 2 are connected by a hook, or other means, 3, to a clevis 4 secured to the lower end of the bracket A which brace rods extend to the plates 5 of which there are two, one being bolted to each side of the vehicle.

A bolt 6 extends vertically from the lower end of the bracket A through the plates 7 and 8 and a brace 9 extends from the upper end of the bolt to the tongue support 10 through which the tongue 11, as shown in dotted lines in Fig. 1, extends for attachment to the vehicle.

A crossbar 12 is secured to the tongue support 10 by bolts 13 and other means and this crossbar 12 carries guards 14, of which there are two extending downwardly and in position to limit the backward movement of the whiffle-tree 15 indicated in dotted lines in Figs. 1 and 2, the whiffle-tree being pivoted in the usual manner upon the tongue 11.

By means of this attachment the strain of the draft is distributed and the entire draft mechanism is attachable to different types of vehicles such as wagons, manure spreaders and the like.

What I claim is:

1. A draft attachment for vehicles including a frame, a crossbar supported thereon, and guards mounted on the crossbar adjacent the outer ends thereof, said guards extending downwardly from the crossbar and being rearward of a whiffle-tree in position to be engaged thereby for regulating the backward movement of the whiffle-tree.

2. A draft attachment for vehicles including a frame, a tongue support, a bracket secured to the frame, the lower end of said bracket being bent laterally, a bolt extending upwardly from the lateral end of the bracket and passing through the tongue support, a brace extending from the upper end of the bolt to the tongue support, plates secured to the sides of the vehicle rearward of the center thereof, and rods extending from the lower end of the bracket to the plates for distributing the draft to a point rearward of the center of the vehicle.

In testimony whereof I affix my signature.

THEODORE TORKELSON.